J. WASS.
UTENSIL COVER.
APPLICATION FILED FEB. 23, 1917.

1,228,150.

Patented May 29, 1917.

Inventor
J. Wass
By
A. M. Wilson
Attorney

UNITED STATES PATENT OFFICE.

JOHN WASS, OF BEAVER FALLS, PENNSYLVANIA.

UTENSIL-COVER.

1,228,150.   Specification of Letters Patent.   Patented May 29, 1917.

Application filed February 23, 1917. Serial No. 150,421.

*To all whom it may concern:*

Be it known that I, JOHN WASS, a subject of the King of Hungary, residing at Beaver Falls, in the county of Beaver and State of Pennsylvania, have invented certain new and useful Improvements in Utensil-Covers, of which the following is a specification.

This invention relates to certain new and useful improvements in utensil covers.

The primary object of the invention is the provision of a lid or cover for cooking utensils, such as pots and providing a normally closed ventilating means.

A further object of the device is the provision of a lid or cover having normally closed outlets therein adapted for manual opening when desired and thereafter automatically closed upon being released.

A still further object of the device is the provision of a pot cover that is easy and inexpensive to manufacture and by means of which the ventilation and outletting of the gaseous contents thereof may be readily accomplished.

In the drawing forming a part of this application and in which like designating characters refer to corresponding parts throughout the several views:—

Figure 1:
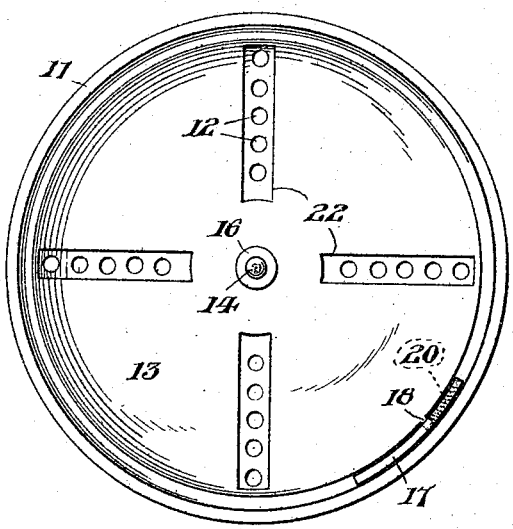
Figure 1 is a bottom plan view of the device with the ventilating means open.
Figure 2:
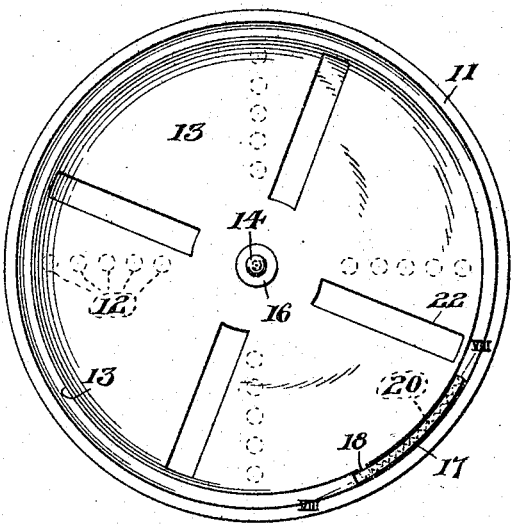
Fig. 2 is a similar view with the device in its normally closed position.
Figure 3:
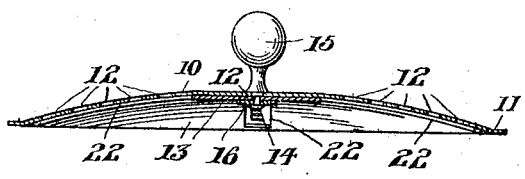
Fig. 3 is a diametrical sectional view taken through the opposite sets of openings as shown in Fig. 1.
Figures 5, 6:
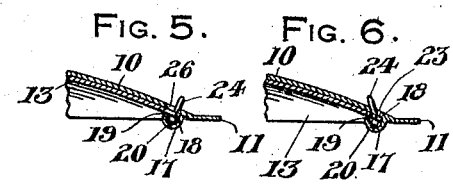
Figs. 5 and 6 are enlarged detail sectional views taken through marginal portions of the device with the latch member in its released and its locked positions respectively.
Figure 4:
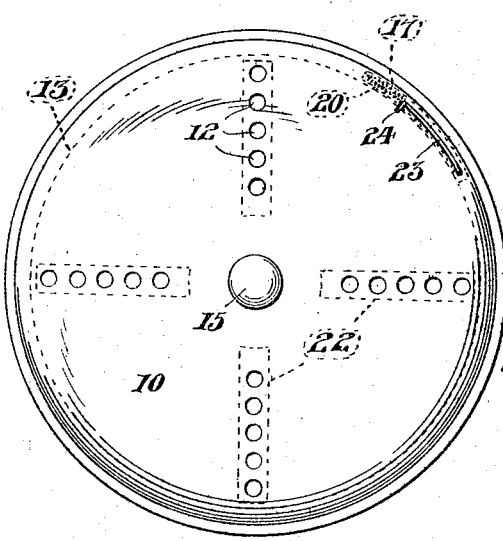
Fig. 4 is a top plan view of the device in its open arrangement.

The device as illustrated by the drawings herein broadly consists of a lid or cover 10 slightly arcuate in cross-section and having a flat annular marginal flange 11 adapted for seating upon the edge of the utensil with which the device is to be employed after the usual manner of a pot lid or cover.

Radially arranged sets of outlet perforations 12 are provided through the lid 10 being herein shown as consisting of four sets, a controlling disk 13 conforming to the inner contour of the lid 10 being centrally pivoted therein by means of a screw 14 projecting therethrough and engaging within a handle 15 centrally mounted upon the lid, a washer 16 being preferably carried by the screw 14 overlying the said disk 13.

Figure 7:
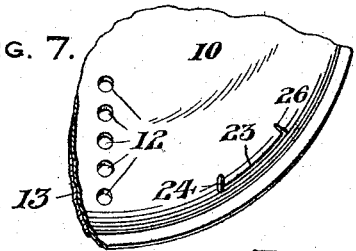
Fig. 7 is a perspective view of an edge portion of the device showing the latch in its normal position.
Figure 8:
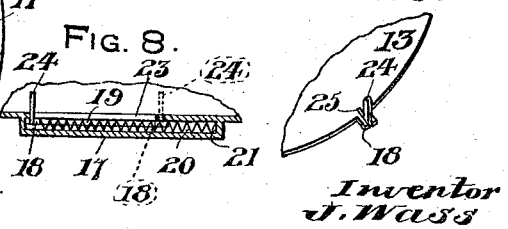
Fig. 8 is a detail sectional view taken upon line VIII—VIII of Fig. 2.
Figure 9:
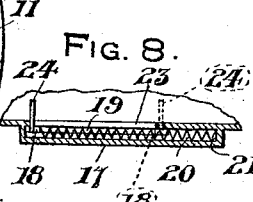
Fig. 9 is a perspective view of an edge portion of the shifting disk illustrating the retaining latch.

A tubular casing 17 is carried by the lid 10 upon the under side thereof adjacent the flange 11 while a slotted lug 18 upon the disk 13 projects within the said casing through an inwardly positioned slot 19 thereof. An expansion spring 20 within the casing 17 is tensioned between one end 21 of the casing and said lug 18 whereby the disk 13 is normally maintained with radial slots 22 provided therein normally out of alinement with the perforations 12, the device being in its closed position. A retaining latch 24 is pivoted within the slot 25 of the lug 18 adapted for sliding longitudinally of a slot 23 in the lid 10, the said latch 24 being normally positioned at a closed end of the slot 23 when the device is closed as best illustrated in Fig. 7 of the drawing.

When it is desired to uncover the perforations 12, the latch 18 is grasped and moved longitudinally within the slot 23, thereby shifting the disk 13 to position the slots 12 thereof so as to uncover the perforations 12 and at which time the latch 24 will be in alinement with a permanent notch 26 of the slot 23 and may be readily swung therein for retaining the device in its open position. Upon outwardly swinging the latch 24 releasing the same from the notch 26, the spring 20 automatically returns the disk 13 for closing the openings 12. A serviceable lid is arranged by means of which the receptacle may be readily outletted and automatically closed instantly when desired.

What I claim as new is:—

1. A device of the class described comprising a lid having outlet perforations, a closure disk for said perforations carried by the lid, a normally relative positioning means for the disk, and an adjustment retaining latch for said means.

2. A device of the class described comprising a lid having outlet perforations, a closure disk revolubly carried by the lid arranged with slots adapted to register with the said openings when the disk is in its shifted position, a combined shifting and adjustment retaining means for the disk pivotally carried thereby, and automatic return means for the disk whereby the latter is normally maintained overlying the said openings.

3. A device of the class described comprising a lid having outlet openings, a closure disk for said openings centrally pivoted to the said lid and provided with radial slots adapted for registering with said openings, a tubular slotted casing carried by the lid, a lug projecting from said disk slidably arranged through the slot of the said casing, a normal positioning spring tensioned between the said lug and the opposite end of the casing, and a combined operating and adjustment retaining means for the said disk.

4. A device of the class described comprising a lid having outlet openings, a closure disk for said openings centrally pivoted to the said lid and provided with radial slots adapted for registering with said openings, a tubular slotted casing carried by the lid, a lug projecting from said disk slidably arranged through the slot of the said casing, a normal positioning spring tensioned between the said lug and the opposite end of the casing, the said lid having an arcuate slot overlying the said casing with a notch adjacent the spring bearing end of the latter, and an operating latch pivoted to the said lug projecting through the said arcuate slot and adapted for seating within the said notch with said spring under compression when the device is open.

In testimony whereof I affix my signature.

JOHN WASS.

Copies of this patent may be obtained for five cents each, by addressing the "Commissioner of Patents, Washington, D. C."